United States Patent [19]

Fujii et al.

[11] 3,759,984
[45] Sept. 18, 1973

[54] PROCESS FOR PREPARING SUCCINIC ACID OR DERIVATIVE THEREOF

[75] Inventors: Chiyuki Fujii, Yamato; Michimasa Hirata, Tokyo; Masao Ogasawara, Machida, all of Japan

[73] Assignee: Denki Kagaku Kogyo K.K., Tokyo, Japan

[22] Filed: Dec. 10, 1971

[21] Appl. No.: 206,867

[30] Foreign Application Priority Data
Dec. 24, 1970 Japan.............................. 45/117292

[52] U.S. Cl...... 260/485 R, 260/485 G, 260/533 A, 260/544 A
[51] Int. Cl............................................. C07c 69/40

[58] Field of Search................. 260/485 R, 533 AN, 260/544 A

[56] References Cited
UNITED STATES PATENTS
3,625,995   12/1971   Brattesani...................... 260/485 R Primary Examiner—Lorraine A. Weinberger
Assistant Examiner—E. Jane Skelly
Attorney—Norman F. Oblon et al.

[57] ABSTRACT

Succinic acid or derivative thereof is prepared by reacting ethylene with carbon monoxide in the presence of a palladium compound.

4 Claims, No Drawings

PROCESS FOR PREPARING SUCCINIC ACID OR DERIVATIVE THEREOF

BACKGROUND OF THE INVENTION

1. Field of the Invention

This invention relates to a process for preparing succinic acid and/or a derivative thereof, by the carbonylation of ethylene with carbon monoxide.

2. Description of Prior Art

Heretofore, succinic acid has been prepared by the reduction of maleic acid or by fermentation of tartaric acid salts. However, it has never been disclosed that succinic acid can be prepared by the reaction of ethylene and carbon monoxide.

Ethylene-carbon monoxide reactions have been disclosed in other contexts for producing other products. For instance, it is known to produce diethyl ketone by the reaction of carbon monoxide in the presence of a cobalt salt catalyst in a polar solvent. It is also known to produce homo-angelica lactone by the reaction of these materials in the presence of palladium bromide in acetonitrile. Also β-chloropropionic chloride has been produced by the reaction of these materials in the presence of palladium chloride in benzene, and acrylic acid has been produced when the reaction is carried out in the presence of palladium chloride in acetic acid (see U.S. Pat. No. 3,387,030).

It would be quite industrially attractive, however, to produce succinic acid from ethylene and carbon monoxide due to the relative cheapness of these materials, and because it would result in substantial process economies as compared with the prior art.

SUMMARY OF THE INVENTION

Accordingly, it is one object of this invention to provide a process for preparing succinic acid and/or derivatives thereof by reacting ethylene with carbon monoxide in an economical and industrially acceptable manner.

This and other objects and features of this invention, as will hereinafter become more readily apparent, can be attained by reacting ethylene with carbon monoxide in the presence of a palladium compound and an amino acid in a solvent.

Preferably, the subject reaction is carried out in the presence of a palladium compound having a strong acid residual group, an amino acid, and a heavy metal salt while supplying oxygen to increase the reaction rate and to prolong the catalyst life.

DETAILED DESCRIPTION OF THE INVENTION

The palladium compounds used in the process of this invention are preferably the palladium salts, and especially the strong acid salts of palladium having a strong acid residual group. Typical of such palladium compounds, are palladium chloride, palladium bromide, palladium iodide, palladium sulfonates, palladium oxyhalides, such as palladium chlorate, palladium halogenoacetates, palladium nitrate, palladium sulfate, palladium chlorosulfonate or the like.

It is also possible to use a combination of a palladium compound and a strong acid to prepare strong acid salts of palladium in the reaction system; for instance, palladium acetate combined with hydrogen chloride, palladium oxide combined with nitric acid, or the like.

Suitable amino acids used in this process include the aliphatic amino acids, e.g., glycine, alanine, valine, the oxyamino acids, e.g., serine, threonine, tyrosine; the aromatic amino acids, e.g., phenylalanine, tyrosine; the acidic amino acids, e.g., glutamic acid; the basic amino acids, e.g., lysine and derivatives thereof. However, sulphur-containing amino acids such as methionine, cysteine, cystine, etc. are not as effective as the others for the process of this invention.

It is believed that these amino acids react with the palladium compounds to form complexes which are catalytic toward the reaction of ethylene and carbon monoxide and are effective for providing a high degree of selectivity toward the resulting products. Accordingly, as one embodiment of this invention, it is possible to charge to the reaction system, a complex of palladium and amino acid, which has previously been prepared outside of the reaction system.

Regardless of whether the complex is found in situ or outside the reaction system, it is desirable to add a heavy metal salt to activate the palladium compound and the amino acid catalysts. The heavy metal salt used functions as an oxidizing agent to recover the high catalytic activity of the palladium compound whereby the palladium formed by the reduction of the palladium compound in the carbonyl reaction is oxidized and thereby reactivated.

Suitable heavy metal salts include those salts of copper, iron and nickel. Most preferred are those heavy metal salts which are soluble in the reaction system. Suitable anionic groups for those heavy metal salts may be any of those which are specified above as being useful in the palladium compounds.

It is preferable to use the palladium compound in an amount of from 0.00001 percent – 10 percent by weight, calculated as Pd, based on the total reactants. The amino acid may suitably be used in at least equimole amounts and preferably two to 10 times of the equimolar amount based on the moles of palladium compound. The heavy metal salts may be used in amounts of from one to 100 times the equimolar amount and preferably from two to 20 times the equimolar amount based on the moles of palladium compound.

The process of this invention can be used to provide the desired succinic acid or the ester or halide thereof by use of the appropriate selection of solvent. If an alcohol is used as the solvent, succinic ester will be produced; when water is used, succinic acid will be produced; and when a halogen in an inert solvent is used, succinic halide will be produced. Suitable alcohols used for this purpose can be any alcohol which will form the corresponding ester. Typical of such alcohols include the aliphatic alcohols, e.g., methanol, ethanol, n-propanol, i-propanol, n-butanole, i-butanol, secondary butanol and glycol, which may be used in greater than stoichiometric amounts.

Suitable solvents for preparing the acid chloride are the aromatic hydrocarbons, e.g., benzene; the aliphatic hydrocarbons, e.g., n-heptane; the alicyclic hydrocarbons, e.g., cyclohexane; the halogenated hydrocarbons, e.g., carbon tetrachloride; the aliphatic ethers, e.g., ethyl-ether; the ketones, e.g., acetone; the nitriles, e.g., acetonitrile; the esters, e.g., ethyl acetate; dimethyl sulfoxide, etc. Mixtures of any of these solvents may also be used.

This reaction may be carried out at room temperature and atmospheric pressure. However, it is preferable to effect the reaction at 40°- 250°C., i.e., any temperature which is lower than the decomposition temperature of the amino acid, under a pressure of 5 – 500 kg/cm$^2$.

The ratio of ethylene, carbon monoxide and oxygen is not considered to be critical. However, it is preferable that the molar ratio of carbon monoxide to ethylene be between 0.2 – 10:1. The oxygen should preferably be used in amounts of less than that of ethylene and less than that amount which could cause accidental explosion. If desired, the reactant gas may be diluted with an inert gas, such as nitrogen, argon, carbon dioxide, methane, or helium.

Having generally described the invention, a further understanding can be obtained by reference to certain specific Examples which are provided herein for purposes of illustration only and are not intended to be limiting in any manner unless otherwise specified.

EXAMPLE 1

Into a 100 ml. autoclave made of stainless steel, 50 ml. of methanol, 0.5 g. of palladium chloride and 0.9 g. of glycine were charged and 40 kg/cm$^2$ of ethylene and 40 kg/cm$^2$ of carbon monoxide were respectively fed and reacted at 100°C. for 15 hours while stirring.

The resulting reaction solution was filtered to remove the solid components and then 100 ml. of water was admixed with the solution and was extracted with 100 ml. of ethyl ether three times. The ether layer was concentrated to obtain 0.28 g. of the resulting product.

According to elementary analysis, gas chromatography analysis, infrared spectrum analysis, nuclear magnetic resonance analysis, the resulting product was confirmed to be dimethyl succinate.

EXAMPLE 2

Into a 100 ml. autoclave made of stainless steel, 50 ml. of methanol, 0.5 g. of palladium chloride, 0.9 g. of glycine and 2.2 g. of ferric chloride were charged and then 30 kg/cm$^2$ of ethylene and 30 kg/cm$^2$ of carbon monoxide were fed and heated at 100°C. while stirring, and further 4 kg/cm$^2$ of oxygen was charged and the reaction was conducted for 9 hours.

The resulting reaction product was treated in accordance with the process of Example 1.

As a result, 0.58 g. of dimethyl succinate and a small amount of dimethyl acetal and methyl acrylate were found to be formed.

EXAMPLE 3

Into a 100 ml. autoclave made of stainless steel, 50 ml. of ethanol, 0.75 g. of palladium bromide, 1.43 g. of threonine and 2.96 g. of nickel bromide were charged and 30 kg/cm$^2$ of ethylene were fed under pressure, and then were heated to 100°C., and 4 kg/cm$^2$ of oxygen was further fed.

The resulting reaction product was treated in accordance with the process of Example 1. By analysis, 0.31 g. of diethyl succinate was found.

EXAMPLE 4

Into a 100 ml. autoclave made of stainless steel, 25 ml. of benzene, 25 ml. of methanol, 1.0 g. of palladium chloride, 2.3 g. of β-alanine and 3.63 g. of cupric chloride were charged, and then 30 kg/cm$^2$ of carbon monoxide and 60 kg/cm$^2$ of ethylene were fed and were heated at 100° C., and then 4 kg/cm$^2$ of oxygen was further fed.

The pressure gradually began to decrease. When the pressure stopped decreasing, 4 kg/cm$^2$ of oxygen was added over a period of 40 minutes, and the resulting reaction product was treated in accordance with the process of Example 1. By analysis, 1.4 g. of dimethyl succinate was found.

EXAMPLE 5

Into a 100 ml. autoclave made of stainless steel, 50 ml. of benzene, 0.5 g. of palladium chloride, 1.98 g. of phenylalanine and 1.81 g. of cupric chloride were charged and 30 kg/cm$^2$ of carbon monoxide and 60 kg/cm$^2$ of ethylene were fed, and were heated at 100° C. and then 4 kg/cm$^2$ of oxygen was fed to effect reaction over a period of 1 hour.

Succinic chloride was found in the reaction product by gas chromatograph analysis. After cooling, methanol was added to the reaction product and refluxed. The resulting product was treated in accordance with the process of Example 1, and 0.21 g. of dimethyl succinate was found.

EXAMPLE 6

Into a 100 ml. autoclave made of stainless steel, 1.30 g. of palladium nitrate, 2.3 g. of β-alanine, 3.63 g. of cupric chloride, and 50 ml. of water were charged and then, 30 kg/cm$^2$ of carbon monoxide was first fed and 60 kg/cm$^2$ of ethylene was further fed and heated at 100° C., and then 4 kg/cm$^2$ of oxygen was further fed to effect reaction over a period of 1 hour. By analysis, acetoaldehyde and 0.38 g. of succinic acid were found.

EXAMPLE 7

Into a 100 ml. autoclave made of stainless steel, 1.26 g. of palladium acetate, 4.78 g. of tyrosine, 6.6 g. of ferric chloride, 50 ml. of 10 percent HCl containing acetone were charged and 30 kg/cm$^2$ of carbon monoxide and 30 kg/cm$^2$ of ethylene were fed and was heated at 100° C., and then 4 kg/cm$^2$ of oxygen was further fed to effect reaction over a period of 1 hour. After cooling the resulting reaction product, it was refluxed with methanol and treated in accordance with the process of Example 5. As the result, 1.07 g. of dimethyl succinate was found.

EXAMPLE 8

1.00 g. of palladium chloride and 2.35 g. of β-alanine were dissolved in 200 ml. of methanol and the solution was stirred at 40° C. for 48 hours, and was filtered. 1.5 g. of yellowish-orange crystal of complex of β-alanine and palladium chloride [Pd/(β-Ala) = 1/3] was obtained. Into a 100 ml. autoclave made of stainless steel, 50 ml. of methanol, 1.5 g. of said complex of β-alanine and palladium chloride and 5.0 g. of cupric chloride were charged and then 50 kg/cm$^2$ of ethylene and 70 kg/cm$^2$ of carbon monoxide were fed and heated at 140° C. and then 5 kg/cm$^2$ of additional oxygen was further charged after pressure decrease for 2 hours.

The resulting reaction product was treated in accordance with the process of Example 1.

As a result, 3.0 g. of dimethyl succinate was found.

Having now fully described the invention, it will be apparent to one of ordinary skill in the art that many changes and modifications can be made thereto without departing from the spirit or scope of the invention.
ACCORDINGLY,
What is claimed is:

1. A process for preparing a succinic compound selected from the group consisting of the corresponding acid, ester and acid halide which comprises reacting ethylene with carbon monoxide, wherein the molar ratio of carbon monoxide to ethylene is 0.2 – 10 : 1 in the presence of a catalytic amount of a halide, halogeno acetate, sulfate, sulfonate, nitrate, chlorosulfonate, or oxyhalide of palladium and an amino acid, selected from the group consisting of glycine, alanine, valine, serine, threonine, tyrosine, phenylalanine, glutamic acid, and lysine in a solvent selected from the group consisting of (a) an alcohol, when said compound produced is the ester, (b) water when said compound produced is the acid, and (c) halogen in an inert solvent when said compound produced is the acid halide, wherein the palladium compound is present in an amount of from 0.00001 – 10 percent calculated as Pd, based on the total weight of reactants and the amino acid is present in at least equimolar amounts based on the moles of palladium compound, and the reaction is conducted at a temperature of lower than the decomposition temperature of the amino acid.

2. The process of claim 1, wherein the palladium compound is reacted with the amino acid to provide an amino acid complex and is used in said reaction in the complex form.

3. The process of claim 1, wherein an iron salt, nickel salt or copper salt is added to the solvent and oxygen is fed to the reaction together with ethylene and carbon monoxide.

4. The process of claim 1, wherein the solvent is selected from the group consisting of aliphatic hydrocarbons, aromatic hydrocarbons, alicyclic hydrocarbons, halogeno hydrocarbons, ethers, esters, nitriles, ketones, and dimethyl sulfoxide.

* * * * *